(12) United States Patent
Lee et al.

(10) Patent No.: US 11,682,759 B2
(45) Date of Patent: Jun. 20, 2023

(54) ANODE ACTIVE MATERIAL, ANODE INCLUDING THE SAME, AND LITHIUM SECONDARY BATTERY INCLUDING THE ANODE

(71) Applicants: SAMSUNG SDI CO., LTD., Yongin-si (KR); Seoul National University R&DB Foundation, Seoul (KR)

(72) Inventors: Jungmin Lee, Yongin-si (KR); Jangwook Choi, Seoul (KR); Yunshik Cho, Seoul (KR); Jaemin Kim, Seoul (KR)

(73) Assignees: SAMSUNG SDI CO., LTD., Yongin-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 401 days.

(21) Appl. No.: 16/850,274

(22) Filed: Apr. 16, 2020

(65) Prior Publication Data

US 2020/0335774 A1 Oct. 22, 2020

(30) Foreign Application Priority Data

Apr. 17, 2019 (KR) .......... 10-2019-0045126
Oct. 28, 2019 (KR) .......... 10-2019-0134817

(51) Int. Cl.
  *H01M 4/36* (2006.01)
  *H01M 4/133* (2010.01)
  (Continued)

(52) U.S. Cl.
  CPC .......... *H01M 4/366* (2013.01); *H01M 4/133* (2013.01); *H01M 4/483* (2013.01); *H01M 4/60* (2013.01);
  (Continued)

(58) Field of Classification Search
  None
  See application file for complete search history.

(56) References Cited

U.S. PATENT DOCUMENTS

| 9,065,138 | B2 | 6/2015 | Jeong et al. |
| 11,075,385 | B2 | 7/2021 | Arikawa et al. |
| (Continued) |

FOREIGN PATENT DOCUMENTS

| CN | 104106162 A | 10/2014 |
| CN | 104106163 A | 10/2014 |
| (Continued) |

OTHER PUBLICATIONS

Cho—Pyrene.Polyacrylic Acid.Polyrotaxane Supramolecular Binder Network for High-Performance Silicon Negative Electrodes.
(Continued)

*Primary Examiner* — Wyatt P McConnell
(74) *Attorney, Agent, or Firm* — Lee IP Law, P.C.

(57) ABSTRACT

An anode active material, an anode including the anode active material; and a lithium secondary battery including the anode, the anode active material including a core including a carbonaceous material; and a polycyclic compound on a surface of the core, the polycyclic compound being represented by Formula 1:

<Formula 1>

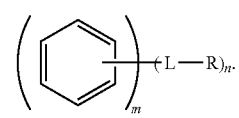

20 Claims, 9 Drawing Sheets

(51) Int. Cl.
*H01M 4/60* (2006.01)
*H01M 10/0525* (2010.01)
*H01M 4/48* (2010.01)
*H01M 4/02* (2006.01)

(52) U.S. Cl.
CPC .. *H01M 10/0525* (2013.01); *H01M 2004/027* (2013.01)

(56) References Cited

U.S. PATENT DOCUMENTS

| | | | |
|---|---|---|---|
| 2014/0356708 A1 | | 12/2014 | Arikawa et al. |
| 2014/0356709 A1 | | 12/2014 | Arikawa et al. |
| 2017/0271681 A1 | * | 9/2017 | Arikawa ............... H01M 4/133 |

FOREIGN PATENT DOCUMENTS

| | | |
|---|---|---|
| JP | 2014-139911 A | 7/2014 |
| JP | 2015-035315 A | 2/2015 |
| JP | 2015-035316 A | 2/2015 |
| KR | 10-2006-0026203 A | 3/2006 |
| KR | 10-2012-0034382 A | 4/2012 |
| KR | 10-2013-0117910 A | 10/2013 |
| KR | 10-2014-0135696 A | 11/2014 |
| KR | 10-2014-0135697 A | 11/2014 |

OTHER PUBLICATIONS

Chinese Office action dated Dec. 7, 2022.
Korean Notice of Allowance dated Mar. 30, 2023.

* cited by examiner

ANODE ACTIVE MATERIAL, ANODE INCLUDING THE SAME, AND LITHIUM SECONDARY BATTERY INCLUDING THE ANODE

CROSS-REFERENCE TO RELATED APPLICATIONS

Korean Patent Application No. 10-2019-0045126, filed on Apr. 17, 2019, and Korean Patent Application No. 10-2019-0134817, filed on Oct. 28, 2019, in the Korean Intellectual Property Office, and entitled: "Anode Active Material, Anode Comprising the Same, and Lithium Secondary Battery Comprising the Anode," are incorporated by reference herein in their entirety.

BACKGROUND

1. Field

Embodiments relate to an anode active material, an anode including the same, and a lithium secondary battery including the anode.

2. Description of the Related Art

Lithium batteries may be used as power sources for portable electronic devices such as video cameras, mobile phones, laptops, or the like. A rechargeable lithium secondary battery may be capable of high-speed charging and may have an energy density per unit weight that is more than three times that of lead storage batteries, nickel-cadmium batteries, nickel-hydrogen batteries, and nickel-zinc batteries.

A lithium secondary battery may be manufactured by using, as a cathode active material and an anode active material, materials which allow reversible intercalation and deintercalation of lithium ions, and by charging an electrolyte between a cathode including the cathode active material and an anode including the anode active material.

SUMMARY

The embodiments may be realized by providing an anode active material including a core including a carbonaceous material; and a polycyclic compound on a surface of the core, the polycyclic compound being represented by Formula 1:

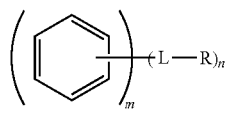

<Formula 1> wherein, in Formula 1, L is a single bond, a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, or a substituted or unsubstituted $C_6$-$C_{20}$ arylene group, R is a polar group or an ionic group, m≥2, and n≥1, wherein, when n is 2 or greater, two or more -L-R are the same or different from one another.

The polycyclic compound may be bound to the surface of the core by non-covalent bonds.

Polycyclic moieties of the polycyclic compound may be bound to the surface of the core by a π-π interaction.

The polycyclic compound may be included in the anode active material in an amount of about 0.01 parts to 5 parts by weight, based on 100 parts by weight of the anode active material.

The core may further include a metal alloyable with lithium or a metal oxide alloyable with lithium.

The core may further include the metal alloyable with lithium, the metal alloyable with lithium may be Si, Sn, Al, Ge, Pb, Bi, Sb, a Si—$Y_1$ alloy, or a Sn—$Y_2$ alloy, $Y_1$ may be an alkali metal, an alkali earth metal, a Group 13 element, a Group 14 element, a transition metal, a rare earth element, or a combination thereof, and is not Si, and $Y_2$ may be an alkali metal, an alkali earth metal, a Group 13 element, a Group 14 element, a transition metal, a rare earth element, or a combination thereof, and is not Sn.

The core may further include the metal oxide alloyable with lithium, the metal oxide alloyable with lithium may be a silicon oxide represented by Formula 2:

$SiO_x$, in which $0<x\leq 2$. <Formula 2>

The carbonaceous material may be on a surface of the metal oxide alloyable with lithium.

The carbonaceous material may be crystalline carbon, amorphous carbon, or a mixture thereof.

In Formula 1, the moiety

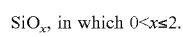

may be a moiety represented by one of Formulae 2-1 to 2-23:

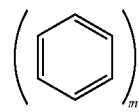

2-1

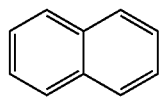

2-2

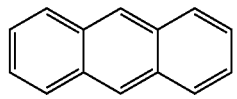

2-3

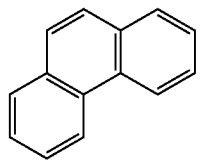

2-4

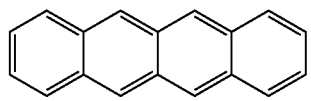

2-5

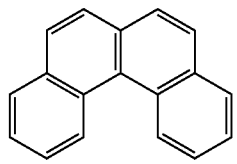

2-6
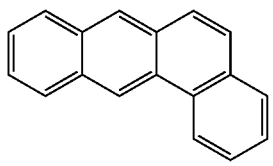
2-7
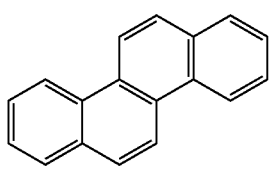
2-8
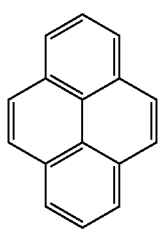
2-9
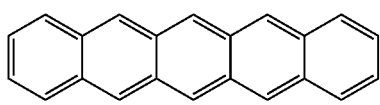
2-10
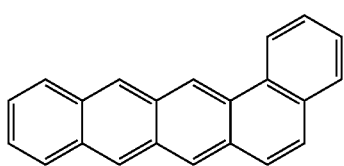
2-11
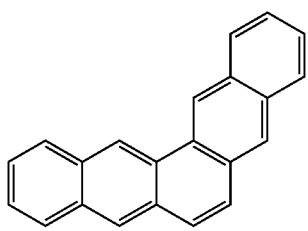
2-12
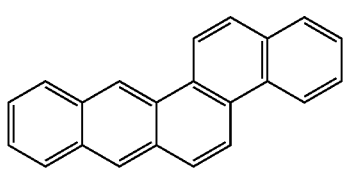
2-13
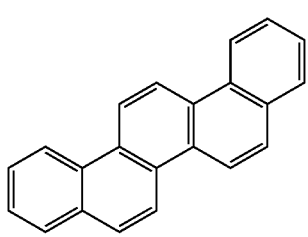
2-14
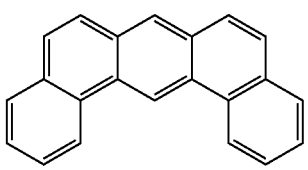
2-15
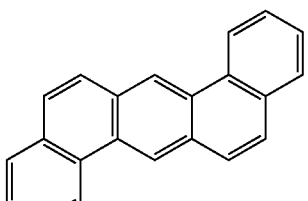
2-16
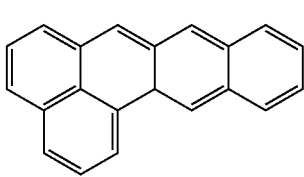
2-17
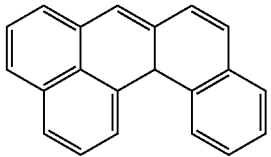
2-18
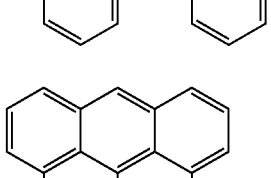
2-19
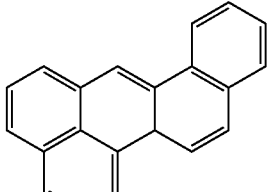
2-20
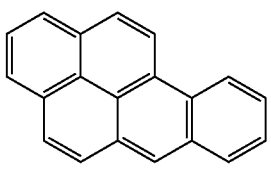
2-21
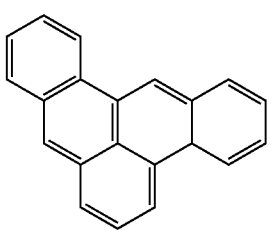

-continued

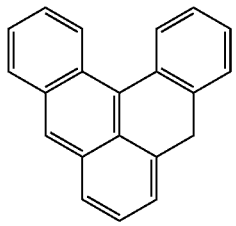

2-22

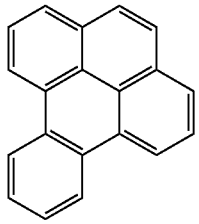

2-23

L may be a single bond; a methylene group, an ethylene group, a propylene group, a butylene group, a pentylene group, a hexylene group, a heptylene group, an octylene group, a nonylene group, or a decylene group; or a methylene group, an ethylene group, a propylene group, a butylene group, a pentylene group, a hexylene group, a heptylene group, an octylene group, a nonylene group, or a decylene group, each substituted with a methyl group, an ethyl group, a propyl group, a butyl group, pentyl group, a hexyl group, a heptyl group, an octyl group, a nonyl group, or a decyl group.

The ionic group may include a cationic group, an anionic group, or a combination thereof.

R may be —OH, —CHO, —COOH, —SO$_3$H, —SO$_4$H, —PO$_4$H, —NH$_2$, —NHR$_a$, —NR$_a$R$_b$, —COO$^-$, —SO$_3{}^-$, —SO$_4{}^{2-}$, —PO$_4{}^{2-}$, —NH$_3{}^+$, —NH$_2$R$_a{}^+$, —NHR$_a$R$_b{}^+$, —NR$_a$R$_b$R$_c{}^+$, or —PR$_a$R$_b$R$_c{}^+$, R$_a$, R$_b$, and R$_c$ may be each independently a substituted or unsubstituted C$_1$-C$_{10}$ alkyl group.

m≥4 and n may be 1 or 2.

The embodiments may be realized by providing an anode including a substrate; and an anode active material layer on the substrate, wherein the anode active material layer includes the anode active material according to an embodiment and a binder, and the anode active material is bonded to the binder by non-covalent bonds.

A binding strength between the anode active material layer and the substrate may be 0.5 gf/mm or greater.

The embodiments may be realized by providing a lithium secondary battery including an anode including the anode active material according to an embodiment; a cathode; and an electrolyte.

A thickness increase ratio of the anode after a first charging cycle of the lithium secondary battery may be 40% or less of the thickness of the anode before the first charging cycle.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
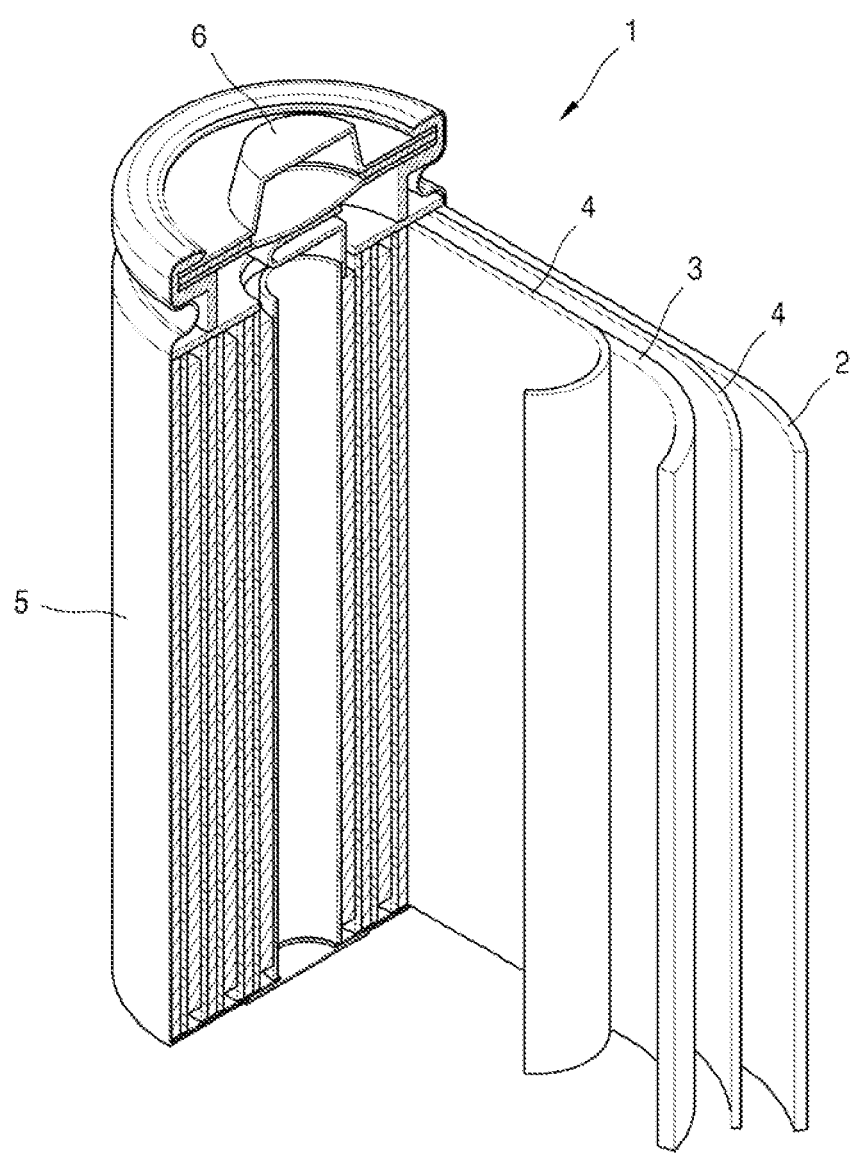
FIG. 1 illustrates a schematic view of a structure of a lithium secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the terms "or" and "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The sign "/" used herein may be construed as meaning of "and" or "or" depending on the situation.

Although the terms "first", "second", etc., may be used herein to describe various elements, components, regions, and/or layers, these elements, components, regions, and/or layers should not be limited by these terms. These terms are used only to distinguish one component from another, not for purposes of limitation. In the drawings, some components may be omitted. However, the omission is to help understanding of the disclosure and is not intended to exclude the omitted components.

As used herein, the term "$C_1$-$C_{10}$ alkyl group" may refer to a monovalent linear or branched hydrocarbon group having 1 to 10 carbon atoms. Examples of the $C_1$-$C_{10}$ alkyl group may include a methyl group, an ethyl group, an iso-propyl group, a propyl group, and a butyl group.

As used herein, the term "$C_1$-$C_{20}$ alkylene group" may refer to a divalent group having the same structure as the $C_1$-$C_{20}$ alkyl group.

As used herein, the term "$C_2$-$C_{20}$ alkenylene group" may refer to a divalent hydrocarbon group including at least one carbon-carbon double bond in the $C_2$-$C_{20}$ alkyl group.

As used herein, the term "$C_2$-$C_{20}$ alkynylene group" may refer to a divalent hydrocarbon group including at least one carbon-carbon triple bond in the $C_2$-$C_{20}$ alkyl groups.

As used herein, the term "$C_6$-$C_{20}$ arylene group" may refer to a divalent aromatic hydrocarbon ring group having 6 to 20 carbon atoms. When two or more hydrocarbon rings are included, the two or more hydrocarbon rings may be condensed with each other.

As used herein, at least one of the substituents in the substituted $C_1$-$C_{10}$ alkyl group, that substituted $C_1$-$C_{20}$ alkylene group, the substituted $C_2$-$C_{20}$ alkenylene group, the substituted $C_2$-$C_{20}$ alkynylene group, and the substituted $C_6$-$C_{20}$ arylene group may be selected from:

a halogen, a $C_1$-$C_{10}$ alkyl group, a $C_2$-$C_{10}$ alkenyl group, a $C_2$-$C_{10}$ alkynyl group;

a $C_6$-$C_{20}$ arylene group; and a $C_6$-$C_{20}$ arylene group substituted with at least one of a $C_1$-$C_{10}$ alkyl group, a $C_2$-$C_{10}$ alkenyl group, and a $C_2$-$C_{10}$ alkynyl group.

Hereinafter, embodiments of an anode active material, an anode including the same, and a lithium secondary battery including the anode will be described in greater detail.

According to an aspect of the disclosure, an anode active material may include, e.g., a core including a carbonaceous material (e.g., a carbon-containing material); and a polycyclic compound on a surface of the core. In an implementation, the polycyclic compound may be represented by Formula 1.

<Formula 1>

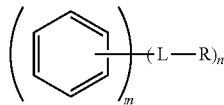

L may be, e.g., a single bond, a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, or a substituted or unsubstituted $C_6$-$C_{20}$ arylene group.

R may be, e.g., a polar group or an ionic group.

m≥2 and n≥1. In Formula 1, m≥2 may indicate that the moiety

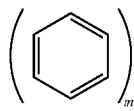

includes two or more fused phenyl moieties. For example, m=2 would indicate that

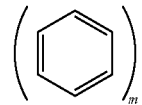

is a naphtyl moiety, m=3 would indicate that

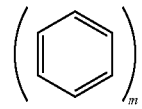

is a anthracene moiety, a phenanthrene moiety, or the like, and so on. For example, m may indicate a number of fused rings in the polycyclic moiety of Formula 1.

In an implementation, when n is 2 or greater, the two or more -L-R may be the same or different from one another.

In the anode active material, the polycyclic compound having a polar group and/or an ionic group may be provided on the core surface, and the polar group and/or ionic group may help improve the binding strength with adjacent other materials in an anode active material slurry, e.g., a binder, a conducting agent, and anode active materials, and may also help improve the binding strength with an anode current collector. In an implementation, the materials included in the anode may be strongly bound together, volume expansion of the anode active material during charging may be effectively suppressed, and an electrode thickness increase ratio may also be reduced. The reduction in electrode thickness increase ratio may help reduce the size of gaps in the active material according to volume change of the anode active material, and thus deterioration of the active material (which could otherwise occur due to side reactions of the active material with liquid electrolyte) may be prevented.

In an implementation, the polycyclic compound may be bound to the core surface by, e.g., a non-covalent bond. The term "non-covalent bond" may refer to binding of atoms or molecules by interactions, other than covalent bonds in which electrons or molecules are shared, e.g., by electrostatic interaction, hydrogen bonding, van der Waals interaction, or hydrophobic interaction.

In an implementation, polycyclic moieties of the polycyclic compound and the surface of the core including the carbonaceous material may be bound by π-π interaction. The "π-π interaction", which is a non-covalent interaction that occurs when the π electron cloud present in a molecule is adjacent to the π electron cloud of another molecule, may refer to an interaction which occurs due to the electrostatic attraction of partial positive charges/negative charges generated by the distribution of electron clouds. Due to the binding of the polycyclic moieties of the polycyclic polar group-containing compound, through the π-π interaction, to the surface of the core including the carbonaceous material, the hydrophilic carbonaceous material or the core including the carbonaceous material on an outer surface thereof may be modified with ionic groups of the polycyclic compound. Due to such surface modification, the carbonaceous material or the core including the carbonaceous material on an outer surface thereof may become hydrophilic, and thus may have enhanced binding strength with a binder including hydrophilic groups, through enhanced non-covalent interaction.

In an implementation, the amount of the polycyclic compound may be, e.g., about 0.01 to 5 parts by weight, based on 100 parts by weight of the anode active material.

In an implementation, the amount of the polycyclic compound may be, e.g., about 0.01 to 4.5 parts by weight, about 0.01 to 4.0 parts by weight, about 0.01 to 3.5 parts by weight, about 0.01 to 3.0 parts by weight, about 0.01 to 2.5 parts by weight, about 0.01 to 2.0 parts by weight, about 0.01 to 1.5 parts by weight, about 0.01 to 1.0 parts by weight, about 0.01 to 0.5 parts by weight, about 0.01 to 0.45 parts by weight, about 0.01 to 0.40 parts by weight, about 0.01 to 0.35 parts by weight, about 0.01 to 0.30 parts by weight, about 0.01 to 0.25 parts by weight, about 0.01 to 0.20 parts by weight, about 0.01 to 0.15 parts by weight, or about 0.01 to 0.10 parts by weight, based on 100 parts by weight of the anode active material. In an implementation, a certain amount of the polycyclic compound which is sufficient to attain a desired binding strength may be selected.

In an implementation, the core may further include a metal alloyable with lithium or a metal oxide alloyable with lithium. When the core further includes a metal alloyable with lithium or a metal oxide alloyable with lithium, the anode active material may have high capacitance, as compared with an active material consisting exclusively of a carbonaceous material.

In an implementation, the metal alloyable with lithium may be, e.g., Si, Sn, Al, Ge, Pb, Bi, Sb, Si—$Y_1$ alloy (in which $Y_1$ may be at least one element selected from an alkali metal, an alkali earth metal, a Group 13 element, a Group 14 element, a transition metal, a rare earth element and a combination thereof, and is not Si), or a Sn—$Y_2$ alloy (in which $Y_2$ may be at least one element selected from an alkali metal, an alkali earth metal, a Group 13 element, a Group 14 element, a transition metal, a rare earth element and a combination thereof, and is not Sn). In an implementation, the elements $Y_1$ and $Y_2$ may each independently be, e.g., Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, or Te.

In an implementation, the metal oxide alloyable with lithium may be, e.g., a silicon oxide represented by Formula 2.

$SiO_x$ (in which $0<x\leq2$) <Formula 2>

In an implementation, the core may include a carbonaceous material and/or a metal oxide alloyable with lithium. In an implementation, the carbonaceous material may be on a surface of the metal oxide alloyable with lithium.

In an implementation, the core may include a metal alloyable with lithium, the surface of the metal being coated with a carbonaceous material. In an implementation, the core may include silicon-carbon composite particles in which the surface of silicon particles or secondary silicon particles resulting from aggregation of silicon particles is coated with a carbonaceous material.

In an implementation, the core may include a metal oxide alloyable with lithium, the surface of the metal oxide being coated with a carbonaceous material. For example, the core may include silicon oxide-carbon composite particles in which the surface of silicon oxide is coated with a carbonaceous material.

In an implementation, the core may include a metal alloyable with lithium, the surface of the metal being coated with a carbonaceous material, and a metal oxide alloyable with lithium, the surface of the metal oxide being coated with a carbonaceous material. In an implementation, the core may include carbon-coated silicon-based composite particles in which the surface of secondary silicon particles including a mixture of silicon particles and silicon oxide is coated with a carbonaceous material.

In an implementation, the core may include a carbonaceous material having a cavity at a center thereof. In an implementation, the core may include a carbonaceous material including a cavity at a center thereof, e.g., carbon nanotubes or fullerene.

In an implementation, the core may consist of a carbonaceous material. In an implementation, the core may include natural graphite or artificial graphite.

The carbonaceous material may be, e.g., crystalline carbon, amorphous carbon, or a mixture thereof. The crystalline carbon may be, e.g., graphite such as natural graphite or artificial graphite in amorphous, plate-like, flake-like, spherical or fibrous form. The amorphous carbon may be, e.g., soft carbon (carbon sintered at low temperatures), hard carbon, meso-phase pitch carbides, sintered cokes, or the like.

In an implementation, the carbonaceous material may include crystalline carbon. In an implementation, the carbonaceous material may be natural graphite or artificial graphite in planar form which is formed by condensation of benzene rings on the same plane. Due to this, an anode active material having a structure in which a polycyclic ionic group-containing compound is stacked on the carbonaceous material due to the π-π interaction between the benzene rings of the carbonaceous material and polycyclic moieties of the polycyclic ionic group-containing compound may be obtained.

Accordingly, despite the introduction of the polycyclic ionic group-containing compound, reduction in conductivity of the carbonaceous material may not occur, and intercalation and deintercalation may also be uninterrupted.

In an implementation, in Formula 1, the moiety

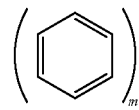

may be, e.g., a moiety represented by one of Formulae 2-1 to 2-23. In an implementation, the moiety may include polycyclic aromatic rings having various structures in which m benzene rings are condensed.

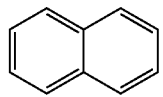

2-1

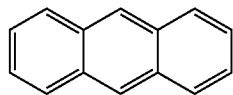

2-2

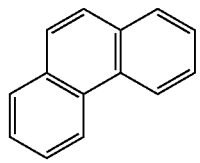

2-3

-continued
2-4
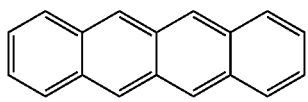
2-5
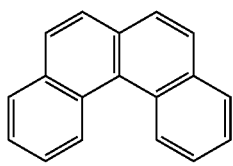
2-6
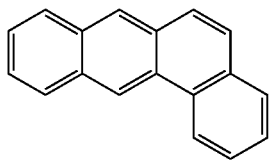
2-7
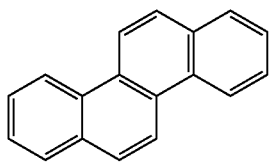
2-8
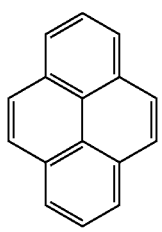
2-9
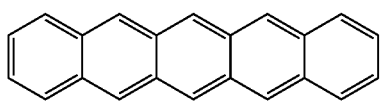
2-10
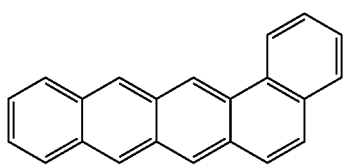
2-11
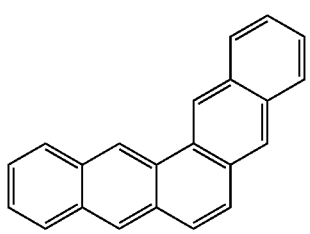
2-12
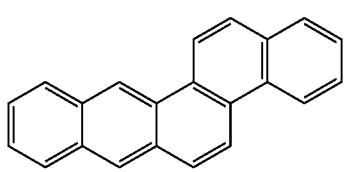
-continued
2-13
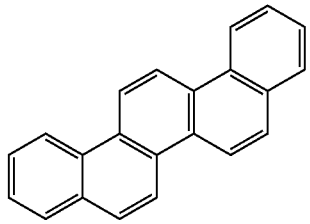
2-14
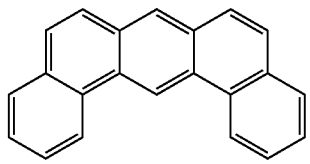
2-15
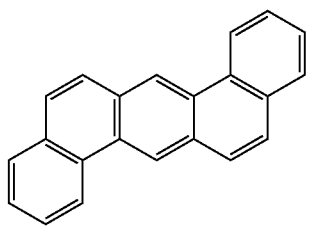
2-16
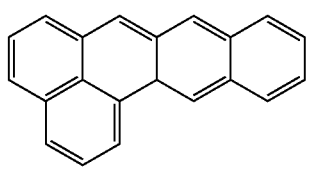
2-17
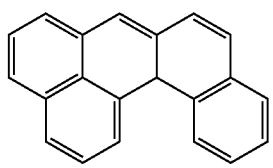
2-18
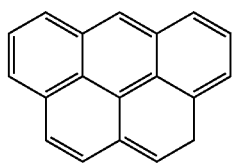
2-19
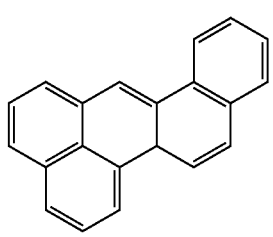
2-20
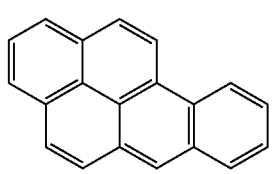

-continued

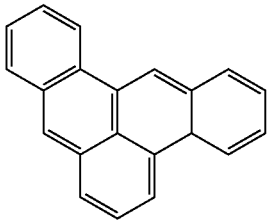

2-21

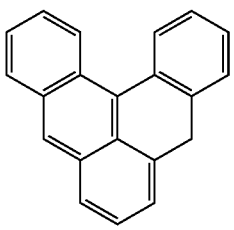

2-22

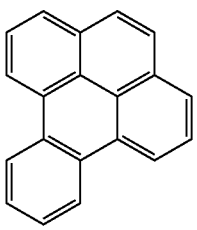

2-23

In an implementation, in Formula 1, L may be e.g., a single bond.

In an implementation, in Formula 1, L may be e.g., a methylene group, an ethylene group, a propylene group, a butylene group, a pentylene group, a hexylene group, a heptylene group, an octylene group, a nonylene group, or a decylene group.

In an implementation, in Formula 1, L may be e.g., a methylene group, an ethylene group, a propylene group, a butylene group, a pentylene group, a hexylene group, a heptylene group, an octylene group, a nonylene group, or a decylene group, each substituted with a methyl group, an ethyl group, a propyl group, a butyl group, pentyl group, a hexyl group, a heptyl group, an octyl group, a nonyl group, or a decyl group.

In an implementation, in Formula 1, L may be e.g., a methylene group, an ethylene group, a propylene group, a butylene group, or a pentylene group.

In an implementation, in Formula 1, L may be e.g., a methylene group, an ethylene group, a propylene group, or a butylene group, each substituted with a methyl group, an ethyl group, a propyl group, a butyl group, pentyl group, a hexyl group, a heptyl group, an octyl group, a nonyl group, or a decyl group.

In Formula 1, R may be, e.g., a polar group or an ionic group.

In an implementation, the ionic group may include, e.g., a cationic group, an anionic group, or a combination thereof.

In an implementation, the ionic group may be, e.g., $-COO^-$, $-SO_3^-$, $-SO_4^-$, $-PO_4^{2-}$; and $NH_3^+$, $NH_2R_a^+$, $NHR_aR_b^+$, $NR_aR_bR_c^+$, ir $PR_aR_bR_c^+$ (in which $R_a$, $R_b$, and $R_c$ may each independently be a substituted or unsubstituted $C_1$-$C_{10}$ alkyl groups).

In an implementation, the polar group may be, e.g., $-OH$, $-CHO$ $-COOH$, $-SO_3H$, $-SO_4H$, $-PO_4H$, $-NH_2$, $-NHR_a$, or $-NR_aR_b$ (in which $R_a$ and $R_b$ may each independently be a substituted or unsubstituted $C_1$-$C_{10}$ alkyl groups).

A substituent of the substituted $C_1$-$C_{10}$ alkyl group may include, e.g., a methyl group, an ethyl group, a propyl group, an iso-propyl group, a butyl group, a sec-butyl group, an iso-butyl group, or a tert-butyl group.

In Formula 1, R may be a polar group or an ionic group, and non-covalent interaction may occur through a π-π interaction between the surface of the anode active material modified with the polycyclic compound and a binder including hydrophilic groups. Thus, the binding strength of the anode active material itself and the binding strength between the current collector and the anode active material may be improved.

In an implementation, in Formula 1, m≥4, and n may be 1 or 2. In an implementation, when m is 4, n may be 1 or 2.

In an implementation, m=4x, and n may be an integer selected from x to 2x (wherein x is an integer of 1 or greater). In an implementation, when m=8, n may be an integer from 2 to 4. When m and n satisfy the above ratio or values, the binding strength between the anode active material and other materials included in the anode, e.g., a binder, a conducting agent, and an anode current collector may be improved, and an anode including the same may have a reduced electrode expansion ratio.

According to another embodiment, an anode may include the anode active material according to any of the above-described embodiments.

According to another embodiment, an anode may include, e.g., a substrate and an anode active material layer on the substrate. The anode active material layer may include the anode active material according to any of the above-described embodiments, and a binder. the anode active material may be bound with or to the binder by non-covalent bonds.

Examples of the non-covalent bonds may include electrostatic interaction, hydrogen bonds, van der Waals interactions, hydrophobic interactions, and combinations thereof.

The substrate may be an anode current collector. The anode current collector may include, e.g., a copper foil, a nickel foil, a stainless steel foil, a titanium foil, a nickel form, a copper form, a polymer substrate coated with a conductive metal, or a combination thereof.

In an implementation, a binding strength between the anode active material layer and the substrate may be, e.g., 0.5 gf/mm or greater.

According to another embodiment, a lithium secondary battery may include an anode including the anode active material according to any of the above-described embodiment, a cathode, and an electrolyte.

The lithium secondary battery may have an anode thickness increase ratio after the first charging cycle of, e.g., about 50% or less. In an implementation, the anode thickness increase ratio after the first charging cycle of the lithium secondary battery may be, e.g., less than 50%, 49% or less, 48% or less, 47% or less, 46% or less, 45% or less, 44% or less, 43% or less, 42% or less, 41% or less, 40% or less, 39% or less, 38% or less, 37% or less, 36% or less, or 35% or less.

In an implementation, the lithium secondary battery may be manufactured according to the following method.

First, a cathode may be prepared as follows.

For example, a cathode active material, a conducting agent, a binder, and a solvent may be mixed to prepare a cathode active material composition. The cathode active material composition may be directly coated on a metallic current collector to prepare a cathode plate. In an implementation, the cathode active material composition may be cast on a separate support to form a cathode active material film, which may then be separated from the support and laminated on a metallic current collector to prepare a cathode plate.

In an implementation, the cathode active material may be a suitable active material, e.g., a lithium-containing metal oxide. In an implementation, the cathode active material may include, e.g., a composite oxide of lithium with a metal selected from cobalt, manganese, nickel, and a combination thereof. The cathode active material may be a compound represented by one of the following formulae: $Li_aA_{1-b}B^1_bD^1_2$ (wherein 0.90≤a≤1.8, and 0≤b≤0.5); $Li_aE_{1-b}B^1_bO_{2-c}D^1_c$ (wherein 0.90≤a≤1.8, 0≤b≤0.5, and 0≤c≤0.05); $LiE_{2-b}B^1_bO_{4-c}D^1_c$ (wherein 0≤b≤0.5, and 0≤c≤0.05); $Li_aNi_{1-b-c}Co_bB^1_cD^1_\alpha$ (wherein 0.90≤a≤1.8, 0≤b≤0.5, 0≤c≤0.05, and 0<α≤2); $Li_aNi_{1-b-c}Co_bB^1_cO_{2-\alpha}F^1_\alpha$ (wherein 0.90≤a≤1.8, 0≤b≤0.5, 0≤c≤0.05, and 0<α<2); $Li_aNi_{1-b-c}Co_bB^1_cO_{2-\alpha}F^1_2$ (wherein 0.90≤a≤1.8, 0≤b≤0.5, 0≤c≤0.05, and 0<α<2); $Li_aNi_{1-b-c}Mn_bB^1_cD^1_\alpha$ (wherein 0.90≤a≤1.8, 0≤b≤0.5, 0≤c≤0.05, and 0<α≤2); $Li_aNi_{1-b-c}Mn_bB^1_cO_{2-\alpha}F^1_\alpha$ (wherein 0.90≤a≤1.8, 0≤b≤0.5, 0≤c≤0.05, and 0<α<2); $Li_aNi_{1-b-c}Mn_bB^1_cO_{2-\alpha}F^1_2$ (wherein 0.90≤a≤1.8, 0≤b≤0.5, 0≤c≤0.05, and 0<α<2); $Li_aNi_bE_cG_dO_2$ (wherein 0.90≤a≤1.8, 0≤b≤0.9, 0≤c≤0.5, and 0.001≤d≤0.1); $Li_aNi_bCo_cMn_dGeO_2$ (wherein 0.90≤a≤1.8, 0≤b≤0.9, 0≤c≤0.5, 0≤d≤0.5, and 0.001≤e≤0.1); $Li_aNiG_bO_2$ (wherein 0.90≤a≤1.8, and 0.001≤b≤0.1); $Li_aCoG_bO_2$ (wherein 0.90≤a≤1.8, and 0.001≤b≤0.1); $Li_aMnG_bO_2$ (wherein 0.90≤a≤1.8, and 0.001≤b≤0.1); $Li_aMn_2G_bO_4$ (wherein 0.90≤a≤1.8, and 0.001≤b≤0.1); $QO_2$; $QS_2$; $LiQS_2$; $V_2O_5$; $LiV_2O_5$; $LiI^1O_2$; $LiNiVO_4$; $Li_{(3-f)}J_2(PO_4)_3$ (wherein 0≤f≤2); $Li_{(3-f)}Fe_2(PO_4)_3$ (wherein 0≤f≤2); and $LiFePO_4$.

In the formulae above, A may be nickel (Ni), cobalt (Co), manganese (Mn), or a combination thereof; $B^1$ may be aluminum (Al), nickel (Ni), cobalt (Co), manganese (Mn), chromium (Cr), iron (Fe), magnesium (Mg), strontium (Sr), vanadium (V), a rare earth element, or a combination thereof; $D^1$ may be oxygen (O), fluorine (F), sulfur (S), phosphorus (P), or a combinations thereof; E may be cobalt (Co), manganese (Mn), or a combination thereof; $F^1$ may be fluorine (F), sulfur (S), phosphorus (P), or a combination thereof; G may be aluminum (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; $I^1$ may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof.

In an implementation, the cathode active material may be $LiCoO_2$, $LiMn_xO_{2x}$ (wherein x=1 or 2), $LiNi_{1-x}Mn_xO_{2x}$ (wherein 0<x<1), $LiNi_{1-x-y}Co_xMn_yO_2$ (wherein 0≤x≤0.5 and 0≤y≤0.5), or $LiFePO_4$.

The compounds listed above as cathode active materials may have a surface coating layer (hereinafter, also referred to as "coating layer") on a surface, or a mixture of a compound without a coating layer and a compound having a coating layer, the compounds being selected from the compounds listed above, may be used. The coating layer may include at least one compound of a coating element selected from oxide, hydroxide, oxyhydroxide, oxycarbonate, and hydroxycarbonate of the coating element. The compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. The coating layer may be formed using a suitable method that does not adversely affect the physical properties of the cathode active material when a compound of the coating element is used. In an implementation, the coating layer may be formed using a spray coating method, or a dipping method.

In an implementation, the conducting agent may include, e.g., carbon black or graphite particles or another suitable material available as a conducting agent.

In an implementation, the binder may be, e.g., a vinylidene fluoride/hexafluoropropylene copolymer, polyvinylidene fluoride (PVDF), polyacrylonitrile, polymethyl methacrylate, polytetrafluoroethylene or a mixture thereof, or a styrene butadiene rubber-based polymer.

In an implementation, the solvent may be, e.g., N-methylpyrrolidone, acetone, or water.

The amounts of the cathode active material, the conducting agent, the binder, and the solvent may be suitable amounts for lithium batteries. At least one of the conducting agent, the binder, and the solvent may be omitted according to the use and the structure of the lithium battery.

Next, an anode may be prepared as follows.

In an implementation, the anode active material according to any of the above-described embodiments, a conducting agent, a binder, and a solvent may be mixed to prepare an anode active material composition. The anode active material composition may be directly coated on a metallic current collector to prepare an anode plate. In an implementation, the anode active material composition may be cast on a separate support to form an anode active material film, which may then be separated from the support and laminated on a metallic current collector to prepare an anode plate.

In an implementation, the amount of the binder may be, e.g., about 1.0 to 10 parts by weight, based on 100 parts by weight of the anode active material layer. As the binding strength of the anode active material layer to the current collector is improved, the amount of the binder may be reduced. In an implementation, as the amount of the binder in the anode active material layer is reduced, the anode may have reduced resistance and increased capacity density, and thus the battery performance may be improved.

In an implementation, the amounts of the conducting agent, and the solvent may be suitable amounts for lithium batteries. At least one of the conducting agent, the binder, and the solvent may be omitted according to the use and the structure of the lithium battery.

Next, a separator to be disposed between the cathode and the anode is prepared.

The separator may be a suitable separator for a lithium battery. In an implementation, the separator may have low resistance to migration of ions in an electrolyte and have an excellent electrolyte-retaining ability. Examples of materials for the separator may include glass fiber, polyester, Teflon, polyethylene, polypropylene, polytetrafluoroethylene (PTFE), and a combination thereof, each of which may be a non-woven or woven fabric. In an implementation, a rollable separator including polyethylene or polypropylene may be used for a lithium ion battery. A separator with a good organic electrolytic solution-retaining ability may be used for a lithium ion polymer battery. In an implementation, the separator may be manufactured in the following manner.

In an implementation, a polymer resin, a filler, and a solvent may be mixed together to prepare a separator composition. Then, the separator composition may be directly coated on an electrode, and then dried to form the separator. In an implementation, the separator composition may be cast on a support and then dried to form a separator film, which may then be separated from the support and laminated on an electrode to form the separator.

The polymer resin used to manufacture the separator may be a suitable material for a binder for electrode plates. Examples of the polymer resin may include a vinylidene-fluoride/hexafluoropropylene copolymer, polyvinylidene fluoride (PVDF), polyacrylonitrile, polymethylmethacrylate, and a mixture thereof.

Then, an electrolyte may be prepared as follows.

In an implementation, the electrolyte may be an organic electrolyte solution. In an implementation, the electrolyte may be in a solid phase. Examples of the electrolyte may include boron oxide and lithium oxynitride. A suitable material available as a solid electrolyte may be used. In an implementation, the solid electrolyte may be formed on the anode by, e.g., sputtering.

In an implementation, the organic electrolyte solution may be prepared by dissolving a lithium salt in an organic solvent.

The organic solvent may be a suitable solvent. In an implementation, the organic solvent may include, e.g., propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, diethylene glycol, dimethyl ether, or a mixture thereof.

The lithium salt may be a suitable material. In an implementation, the lithium salt may include, e.g., $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are each independently a natural number), LiCl, LiI, or a mixture thereof.

Referring to FIG. 1, a lithium battery 1 according to an embodiment may include a cathode 3, an anode 2, and a separator 4. The cathode 3, the anode 2, and the separator 4 may be wound or folded, and then sealed in a battery case 5. Then, the battery case 5 may be filled with an organic electrolyte solution and sealed with a cap assembly 6, thereby completing the manufacture of the lithium battery 1. The battery case 5 may be a cylindrical type, a rectangular type, or a thin-film type. In one embodiment, the lithium battery 1 may be a thin-film type battery. In an implementation, the lithium battery 1 may be a lithium ion battery.

In an implementation, the separator may be between the cathode and the anode to form a battery assembly. In an implementation, the battery assembly may be stacked in a bi-cell structure and impregnated with the electrolytic solution. The resultant assembly may be put into a pouch and hermetically sealed, thereby completing the manufacture of a lithium ion polymer battery.

In an implementation, a plurality of battery assemblies may be stacked to form a battery pack, which may be used in a suitable device that requires high capacity and high output, e.g., in a laptop computer, a smart phone, or an electric vehicle.

In an implementation, the lithium battery may have improved lifetime characteristics and high rate characteristics, and may be used in an electric vehicle (EV), e.g., in a hybrid vehicle such as a plug-in hybrid electric vehicle (PHEV). The lithium battery may be applicable to the high-power storage field. In an implementation, the lithium battery may be used in an electric bicycle or a power tool.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Preparation Example 1

Preparation of Pyrene Derivative Including $-NH_3^+$ 0.05 g of 1-pyrenemethylamine hydrochloride and 15 mL of distilled water were mixed together and then heated at about 40° C. while stirring for a day to obtain a surface modifier solution including a pyrene derivative represented by the following formula.

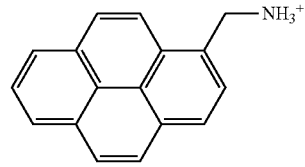 [SMILES: [NH3+]Cc1ccc2ccc3cccc4ccc1c2c34]

Preparation Example 2

Preparation of Pyrene Derivative Including $-COO^-$

After 0.1 g of 1-pyrene butyric acid and 10 mL of distilled water were mixed together, lithium hydroxide monohydrate was added thereto in an amount corresponding to 1 equivalent of 1-pyrene butyric acid and then heated at 40° C. while stirring for a day to obtain a surface modifier solution including a pyrene derivative represented by the following formula.

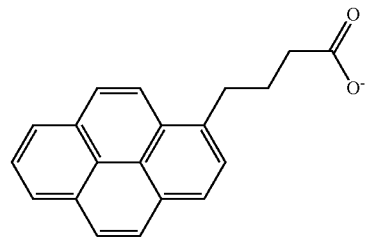 [SMILES: O=C([O-])CCCc1ccc2ccc3cccc4ccc1c2c34]

Preparation Example 3

Preparation of Monocyclic Ionic Group-Containing Compound

After 0.1 g of 4-phenyl butyric acid and 10 mL of distilled water were mixed together, lithium hydroxide monohydrate was added thereto in an amount corresponding to 1 equivalent of 4-phenyl butyric acid and then heated at 40° C. while stirring for a day to obtain a surface modifier solution including a monocyclic ionic group-containing compound represented by the following formula.

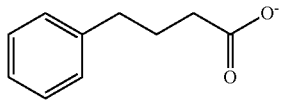 [SMILES: O=C([O-])CCCc1ccccc1]

Preparation Example 4

Preparation of Pyrene Derivative Including —OH 1-pyrene methanol (available from Sigma-Aldrich) was dissolved in DMSO to obtain a 0.1 M surface modifier solution including a polycyclic polar group-containing compound represented by the following formula.

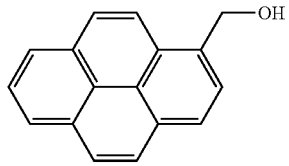 [SMILES: OCc1ccc2ccc3cccc4ccc1c2c34]

Preparation Example 5

Preparation of Monocyclic Compound Including —OH

Phenylmethanol was dissolved in DMSO to obtain a 0.1 M surface modifier solution including a monocyclic polar group-containing compound represented by the following formula.

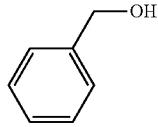

(Manufacture of Anode)

Examples 1 and 2 and Comparative Examples 2 and 4

To manufacture anodes, 1 g of a core material and 0.1 mL of the surface modifier solution prepared in Preparation Example 2 or 3, as represented in Table 1 below, were put into a Thinky mixer and then mixed together. Subsequently, a binder as a 1:1 mixture (by wt %) of styrenebutadiene rubber (SBR) and carboxymethyl cellulose (CMC) was added in an amount (wt %), as represented in Table 1, with respect to the anode active material slurry, and distilled water was added to the Thinky mixer and mixed together to obtain an anode active material. The slurry was cast on a copper current collector and dried at 110° C. under atmospheric pressure for about 10 minutes to thereby manufacture an anode.

Example 3 to 4 and Comparative Example 6 to 7

1 g of a core material and 10 mL of the surface modifier (solution) prepared in Preparation Example 4 or 5, as represented in Table 1, were mixed together and then stirred at ambient temperature for two days. Subsequently, after the obtained mixture was filtered, the residue was dried at 70° C. under atmospheric conditions to obtain an anode active material.

1 g of the obtained anode active material and a binder as a 1:1 mixture (by wt %) of styrenebutadiene rubber (SBR) and carboxymethyl cellulose (CMC) were put into a Thinky mixer and then mixed together to obtain an anode active material slurry. The slurry was cast on a copper current collector and dried at 110° C. under atmospheric pressure for about 10 minutes to thereby manufacture an anode.

Comparative Examples 1, 3 and 5

To manufacture anodes, 1 g of a core material and a binder as a 1:1 mixture (by wt %) of styrenebutadiene rubber (SBR) and carboxymethyl cellulose (CMC), as represented in Table 1, were mixed together to obtain an anode active material slurry. The slurry was cast on a copper current collector and dried at 110° C. under atmospheric pressure for about 10 minutes to thereby manufacture an anode.

TABLE 1

|  | Core material | Surface modifier | Amount of binder (wt %) |
| --- | --- | --- | --- |
| Example 1 | graphite | Preparation Example 2 | 5 |
| Example 2 | carbon-coated $SiO_x$ | Preparation Example 2 | 10 |
| Example 3 | graphite | Preparation Example 4 | 2 |
| Example 4 | carbon-coated $SiO_x$ | Preparation Example 4 | 10 |
| Comparative Example 1 | graphite | — | 5 |
| Comparative Example 2 | graphite | Preparation Example 3 | 5 |
| Comparative Example 3 | carbon-coated $SiO_x$ | — | 10 |
| Comparative Example 4 | carbon-coated $SiO_x$ | Preparation Example 3 | 10 |
| Comparative Example 5 | graphite | — | 2 |
| Comparative Example 6 | graphite | Preparation Example 5 | 2 |
| Comparative Example 7 | carbon-coated $SiO_x$ | Preparation Example 5 | 10 |

(Manufacture of Coin Cell)

Example 5 to 8 and Comparative Example 8 to 13

Each of the anodes manufactured in Examples 1 to 4 and Comparative Examples 1 to 7, a lithium foil as a counter electrode, and a porous polyethylene film as a separator arranged between the anode and the counter electrode were used, and an organic electrolyte solution (1M $LiPF_6$ EC/DEC=1/1 (v/v) FEC 10 wt %) was injected to thereby manufacture an anode half cell.

Evaluation Example 1

Evaluation of Binding Strength

Each of the anodes manufactured in Examples 1 to 4 and Comparative Examples 1 to 7 was cut to a size of 30 mm (width) and 60 mm or greater (length). Each anode sample was attached to a glass substrate with a double-sided tape (having an area of 25 mm (width)×30 mm (length)) adhered thereto, and then one side of the glass substrate and one side of the anode sample were fixed to a Universal Testing Machine at 180 degrees. A displacement value was set to be in the range of 0 mm to 30 mm, and the strength of the force required to detach the anode sample from the glass substrate was quantitatively measured. The results are shown in FIGS. 2, 4, 6, and 8.

Figure 2:
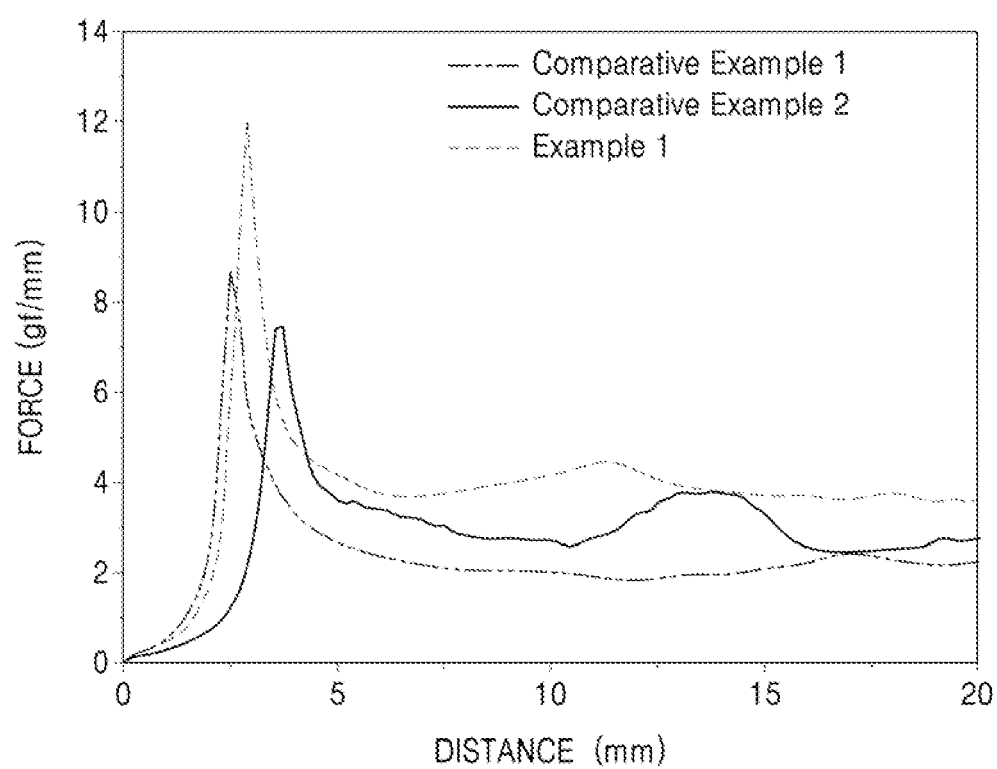
FIG. 2 illustrates a graph of results of a binding strength test of anodes of Example 1 and Comparative Examples 1 and 2.

Referring to FIG. 2, the anode (Example 1) including the carbonaceous anode active material having the surface modified by the pyrene derivative having a charge had a maximum binding strength increased by about 50% or greater as compared to that of the anode (Comparative Example 1) including the carbonaceous anode active material of which surface was not modified, and the anode (Comparative Example 2) including the carbonaceous anode active material of which surface was modified by the phenyl (e.g., monocyclic) derivative. In general, the binding strength refers to the force which is maintained to be comparatively stable in the graph of FIGS. 2, 4, 6 and 8 at a distance of more than 5 mm.

Figure 4:
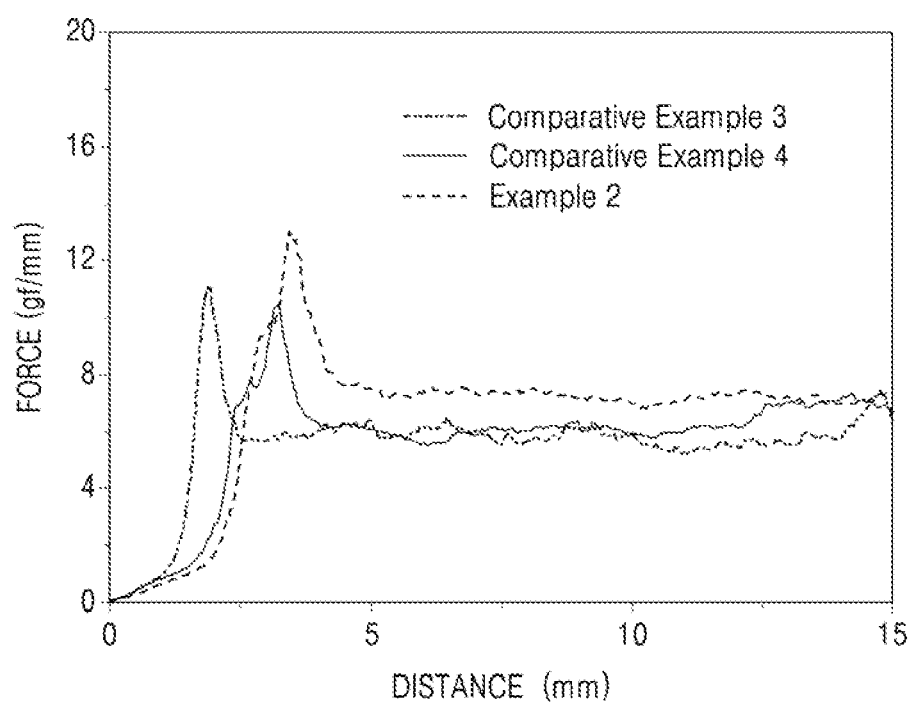
FIG. 4 illustrates a graph of results of a binding strength test of electrodes of Example 2 and Comparative Examples 3 and 4.

Referring to FIG. 4, the anode (Example 2) including the silicon-containing anode active material of which a surface was modified by the pyrene derivative having charges had a maximum binding strength greater by about 15% or greater than that of the anode (Comparative Example 3) including the silicon-containing anode active material of which a surface was not modified, and the anode (Comparative Example 4) including the silicon-containing anode active material of which surface was modified by the phenyl derivative.

Figure 6:
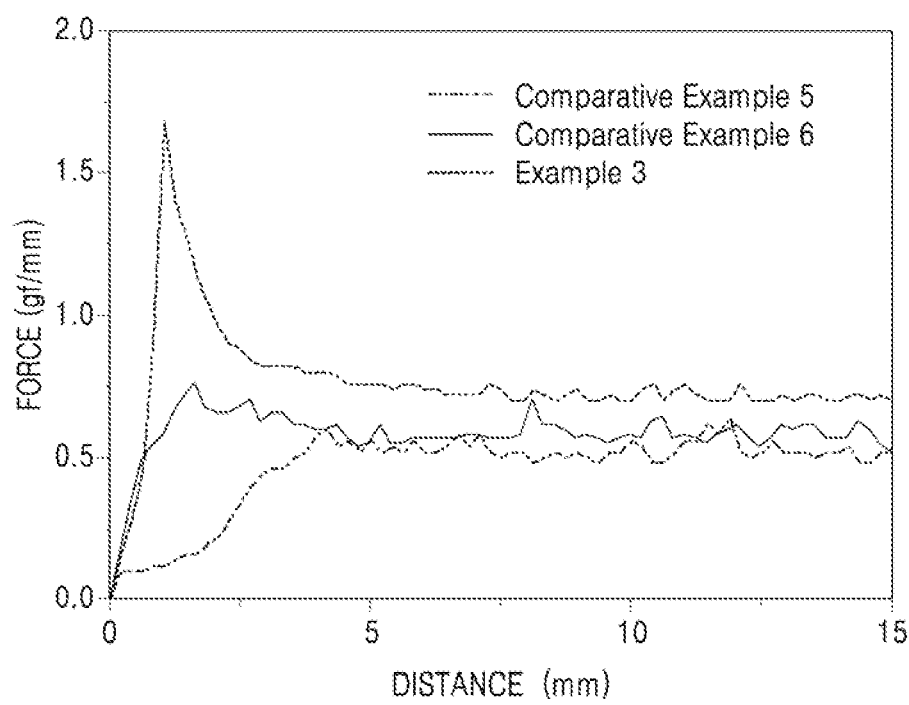
FIG. 6 illustrates a graph of results of a binding strength test of electrodes of Example 3 and Comparative Examples 5 and 6.

Referring to FIG. 6, the anode (Example 3) including the carbonaceous anode active material of which surface was modified by the pyrene derivative having polar groups had a maximum binding strength greater by about 30% or greater than that of the anode (Comparative Example 5) including the carbonaceous anode active material of which a surface was not modified, and the anode (Comparative Example 6) including the carbonaceous anode active material of which a surface was modified by the phenyl derivative.

Figure 8:
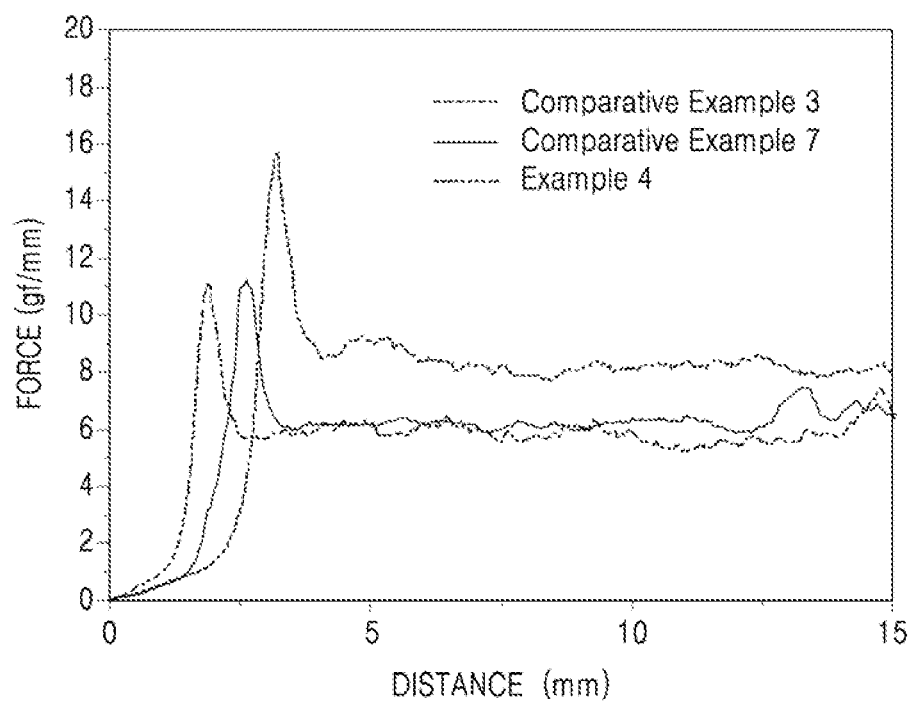
FIG. 8 illustrates a graph of results of a binding strength test of anodes of Example 4 and Comparative Examples 3 and 7.

Referring to FIG. 8, the anode (Example 4) including the silicon-containing anode active material of which surface was modified by the pyrene derivative having polar groups had a maximum binding strength greater by about 30% or greater than that of the anode (Comparative Example 3) including the silicon-containing anode active material of which a surface was not modified, and the anode (Comparative Example 7) including the silicon-containing anode active material of which a surface was modified by the phenyl derivative.

Evaluation Example 2

Evaluation of Electrode Thickness Increase Ratio

After the first charging cycle of the coin cells of Examples 5 to 8 and Comparative Examples 8 and 14 at a current density of 0.2 C, the anode was separated from each coin cell, and changes in thickness after and before the charging were measured. The electrode thickness increase ratios are shown in FIGS. 3, 5, 7, and 9.

Figure 3:
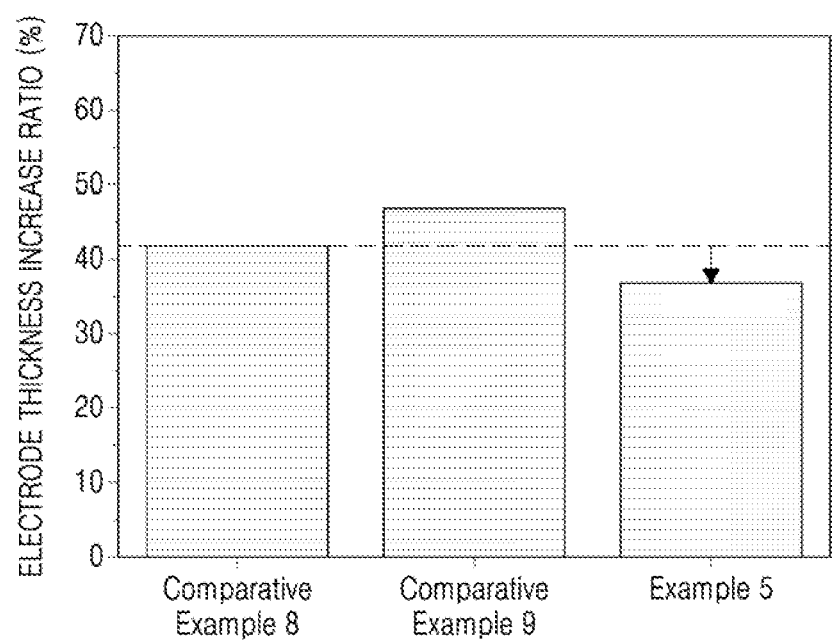
FIG. 3 illustrates a graph of electrode thickness increase ratios of half cells of Example 5 and Comparative Examples 8 and 9 after a first charging cycle.

Referring to FIG. 3, the anode (Example 5) including the carbonaceous anode active material of which the surface was modified by the pyrene derivative having a charge had an electrode thickness increase ratio that was about 5% lower than that of the anode (Comparative Example 8) including the carbonaceous anode active material of which a surface was not modified, and about 10% lower than that of the anode (Comparative Example 9) including the anode active material of which a surface was modified by PhCOO$^-$ (e.g., a monocyclic surface modifier).

Figure 5:
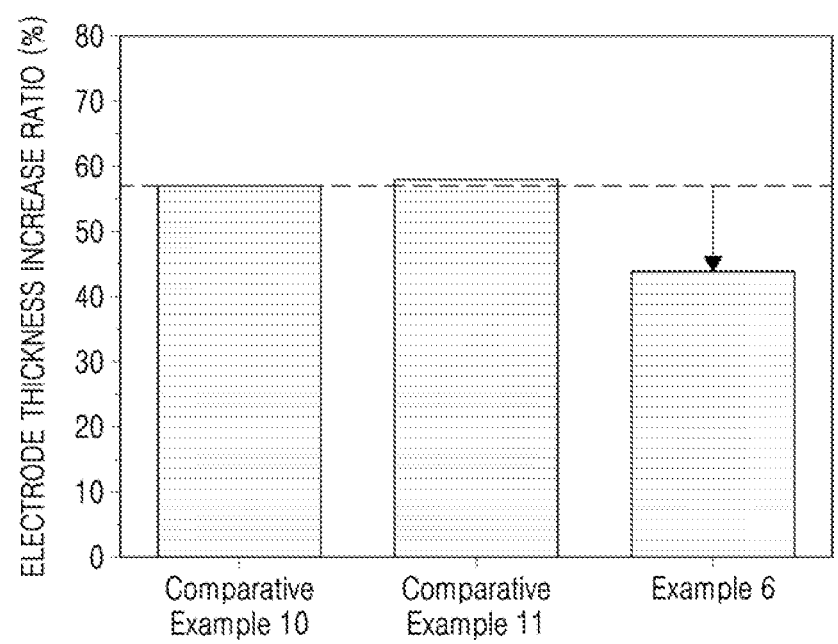
FIG. 5 illustrates a graph of electrode thickness increase ratios of half cells of Example 6 and Comparative Examples 10 and 11 after a single charge.

Referring to FIG. 5, the anode (Example 6) including the silicon-containing anode active material of which a surface was modified by the pyrene derive having charges had an electrode thickness increase ratio that was about 15% lower than that of the anode (Comparative Example 10) including the silicon-containing anode active material of which a surface was not modified, and about 17% lower than the anode (Comparative Example 11) including the silicon-containing anode active material of which a surface was modified by PhCOO$^-$.

Figure 7:
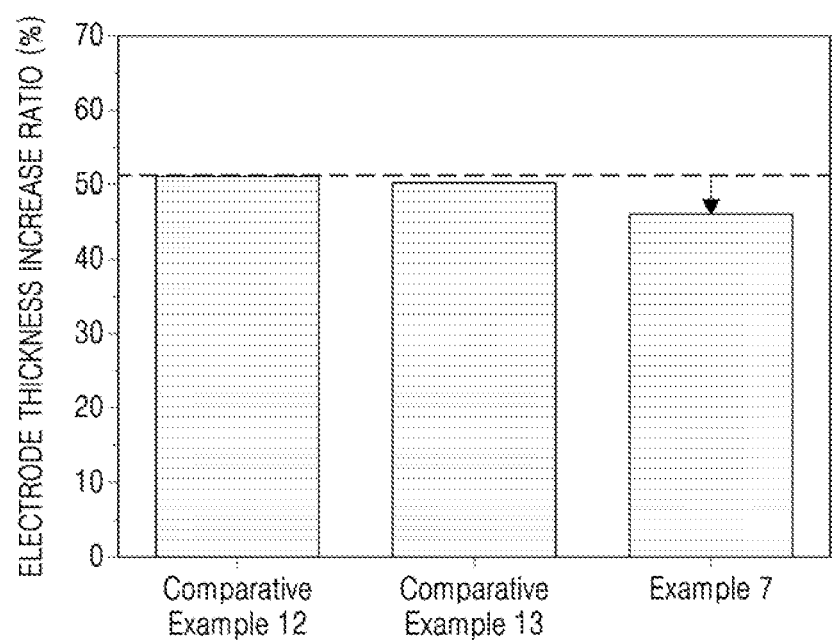
FIG. 7 illustrates a graph of electrode thickness increase ratios of half cells of Example 7 and Comparative Examples 12 and 13 after a single charge.

Referring to FIG. 7, the anode (Example 7) including the carbonaceous anode active material of which a surface was modified by the pyrene derivative having charges had an electrode thickness increase ratio that was about 5% lower than that of the anode (Comparative Example 12) including the carbonaceous anode active material of which a surface was not modified and about 4% lower than that of the anode (Comparative Example 13) including the carbonaceous anode active material of which a surface was modified by phenyl methanol.

Figure 9:
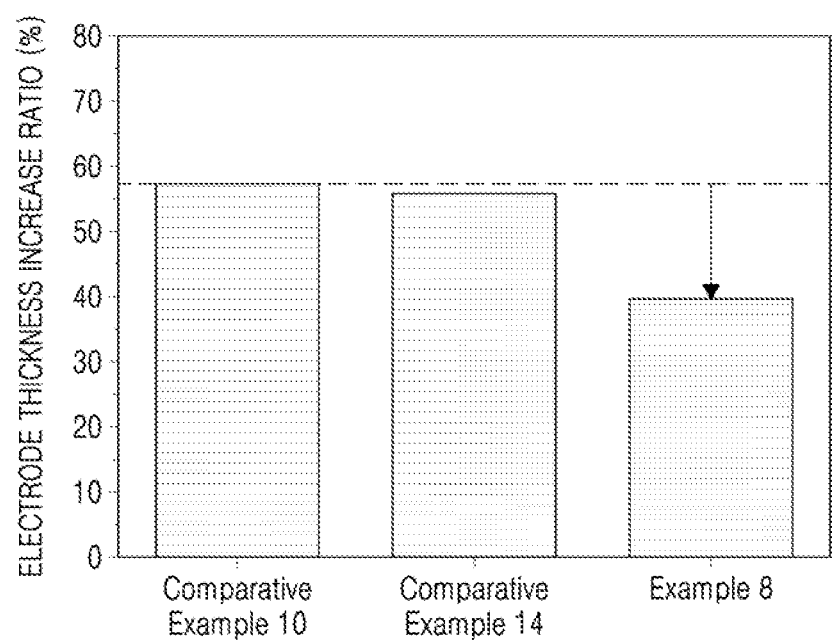
FIG. 9 illustrates a graph of electrode thickness increase ratios of half cells of Example 8 and Comparative Examples 10 and 14 after a single charge.

Referring to FIG. 9, the anode (Example 8) including the silicon-containing anode active material of which a surface was modified by the pyrene derivative having charges had an electrode thickness increase ratio that was about 17% lower than that of the anode (Comparative Example 10) including the silicon-containing anode active material of which a surface was not modified, and about 15% lower than that of the anode (Comparative Example 14) including the silicon-containing anode active material of which a surface was modified by phenyl methanol.

As described above, according to the one or more embodiments, an anode active material may include: a core including a carbonaceous material; and a polycyclic compound including polar groups or ionic groups. The polycyclic compound may be bound to the core by non-covalent bonds, deterioration of the anode active compound may be prevented, and the binding strength between the current collector and other materials in the anode, e.g., a binder and a conducting agent, may also be increased due to enhanced non-covalent bonding caused by the polar groups and/or ionic groups in the polycyclic compound. Accordingly, the amount of the binder may also be reduced.

By way of summation and review, the anode active material for the anode of a lithium secondary battery may include a carbonaceous material with verified stability, along with an appropriate amount of a binder in order to strengthen binding between the anode active material and other materials included in the anode.

In some anodes, gaps could be generated between the materials included in the anode due to a change in volume caused by repeated charging and discharging, resulting in conductivity reduction or deterioration of the anode active material due to side reactions with a liquid electrolyte.

Efforts have been made to modify the surface of the anode active material, e.g., a carbonaceous material, by acid or thermal treatment. However, the carbonaceous material, which is an organic material, may be vulnerable to acid and heat, and reductions in conductivity could occur, due to the breakage of some of the covalent bonds on the carbon surface.

One or more embodiments may provide an anode active material with which other materials included in the anode such a binder and a conducting agent will remain strongly bound.

One or more embodiments may provide an anode active material having improved binding strength with a binder or other materials in an anode.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An anode active material, comprising:
a core including a carbonaceous material; and
a polycyclic compound on a surface of the core, the polycyclic compound being represented by Formula 1:

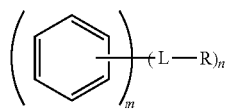

<Formula 1> wherein, in Formula 1,
L is a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, or a substituted or unsubstituted $C_6$-$C_{20}$ arylene group,
R is a polar group or an ionic group,
m≥2, and n≥1,
wherein, when n is 2 or greater, two or more -L-R are the same or different from one another.

2. The anode active material as claimed in claim 1, wherein the polycyclic compound is bound to the surface of the core by non-covalent bonds.

3. The anode active material as claimed in claim 1, wherein polycyclic moieties of the polycyclic compound are bound to the surface of the core by a π-π interaction.

4. The anode active material as claimed in claim 1, wherein the polycyclic compound is included in the anode active material in an amount of about 0.01 parts to 5 parts by weight, based on 100 parts by weight of the anode active material.

5. The anode active material as claimed in claim 1, wherein the core further includes a metal alloyable with lithium or a metal oxide alloyable with lithium.

6. The anode active material as claimed in claim 5, wherein:
the core further includes the metal alloyable with lithium,
the metal alloyable with lithium is Si, Sn, Al, Ge, Pb, Bi, Sb, a Si—$Y_1$ alloy, or a Sn—$Y_2$ alloy,
$Y_1$ is an alkali metal, an alkali earth metal, a Group 13 element, a Group 14 element, a transition metal, a rare earth element, or a combination thereof, and is not Si, and $Y_2$ is an alkali metal, an alkali earth metal, a Group 13 element, a Group 14 element, a transition metal, a rare earth element, or a combination thereof, and is not Sn.

7. The anode active material as claimed in claim 5, wherein:
the core further includes the metal oxide alloyable with lithium,
the metal oxide alloyable with lithium is a silicon oxide represented by Formula 2:

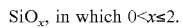

<Formula 2>

8. The anode active material as claimed in claim 7, wherein the carbonaceous material is on a surface of the metal oxide alloyable with lithium.

9. The anode active material as claimed in claim 1, wherein the carbonaceous material is crystalline carbon, amorphous carbon, or a mixture thereof.

10. The anode active material as claimed in claim 1, wherein, in Formula 1, the moiety

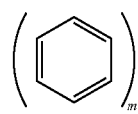

is a moiety represented by one of Formulae 2-1 to 2-23:

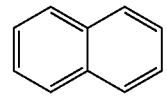

2-1

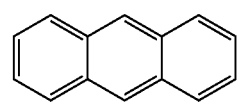

2-2

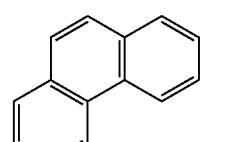

2-3

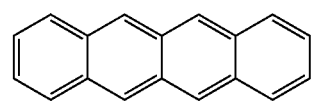

2-4

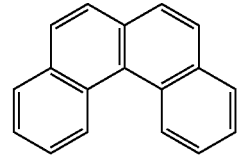

2-5

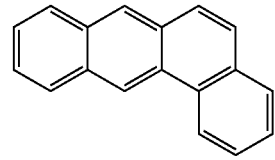

2-6

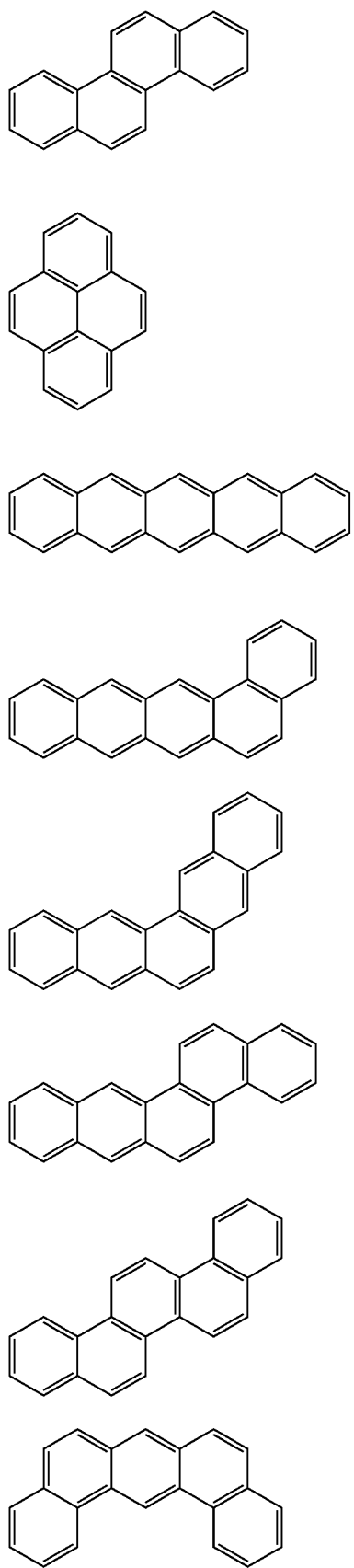
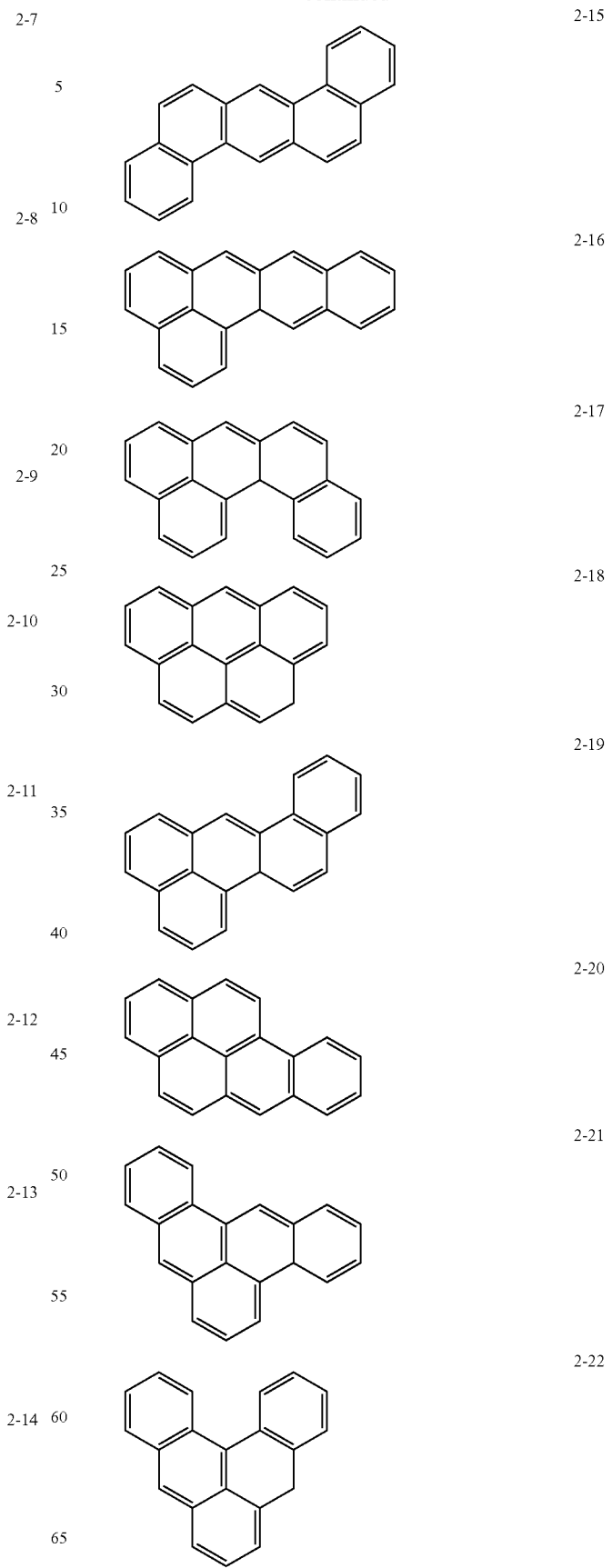

-continued

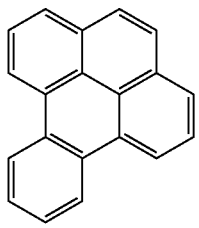

2-23

11. The anode active material as claimed in claim 1, wherein L is:
a methylene group, an ethylene group, a propylene group, a butylene group, a pentylene group, a hexylene group, a heptylene group, an octylene group, a nonylene group, or a decylene group; or
a methylene group, an ethylene group, a propylene group, a butylene group, a pentylene group, a hexylene group, a heptylene group, an octylene group, a nonylene group, or a decylene group, each substituted with a methyl group, an ethyl group, a propyl group, a butyl group, pentyl group, a hexyl group, a heptyl group, an octyl group, a nonyl group, or a decyl group.

12. The anode active material as claimed in claim 1, wherein the ionic group includes a cationic group, an anionic group, or a combination thereof.

13. The anode active material as claimed in claim 1, wherein:
R is —OH, —CHO, —COOH, —SO$_3$H, —SO$_4$H, —PO$_4$H, —NH$_2$, —NHR$_a$, —NR$_a$R$_b$, —COO$^-$, —SO$_3^-$, —SO$_4^{2-}$, —PO$_4^{2-}$, —NH$_3^+$, —NH$_2$R$_a^+$, —NHR$_a$R$_b^+$, —NR$_a$R$_b$R$_c^+$, or —PR$_a$R$_b$R$_c^+$,
R$_a$, R$_b$, and R$_c$ are each independently a substituted or unsubstituted C$_1$-C$_{10}$ alkyl group.

14. The anode active material as claimed in claim 1, wherein m≥4 and n is 1 or 2.

15. An anode, comprising:
a substrate; and
an anode active material layer on the substrate,
wherein:
the anode active material layer includes the anode active material as claimed in claim 1 and a binder, and
the anode active material is bonded to the binder by non-covalent bonds.

16. The anode as claimed in claim 15, wherein a binding strength between the anode active material layer and the substrate is 0.5 gf/mm or greater.

17. A lithium secondary battery, comprising:
an anode including the anode active material as claimed in claim 1;
a cathode; and
an electrolyte.

18. The lithium secondary battery as claimed in claim 17, wherein a thickness increase ratio of the anode after a first charging cycle of the lithium secondary battery is 40% or less of the thickness of the anode before the first charging cycle.

19. The anode active material as claimed in claim 1, wherein:
R is —OH, —CHO, —COOH, —SO$_3$H, —SO$_4$H, —PO$_4$H, —NH$_2$, —NHR$_a$, —NR$_a$R$_b$, —SO$_4^{2-}$, —NH$_3^+$, —NH$_2$R$_a^+$, —NHR$_a$R$_b^+$, —NR$_a$R$_b$R$_c^+$, or —PR$_a$R$_b$R$_c^+$,
R$_a$, R$_b$, and R$_c$ are each independently a substituted or unsubstituted C$_1$-C$_{10}$ alkyl group.

20. The anode active material as claimed in claim 1, wherein, in Formula 1, the moiety

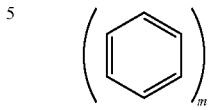

is a moiety represented by one of Formulae 2-3, 2-4 to 2-7, and 2-9 to 2-23:

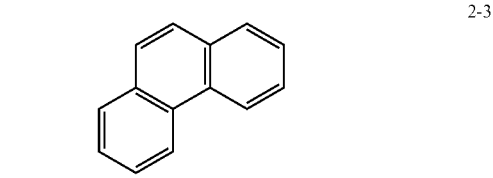

2-3

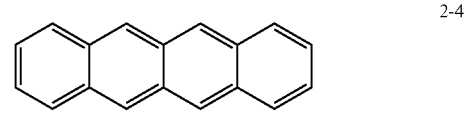

2-4

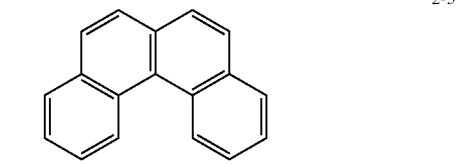

2-5

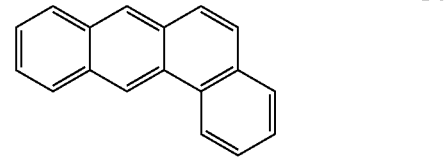

2-6

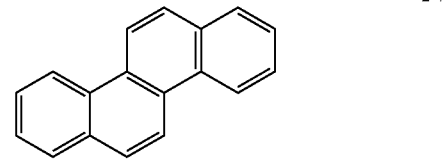

2-7

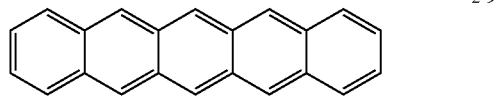

2-9

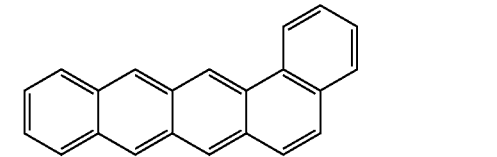

2-10

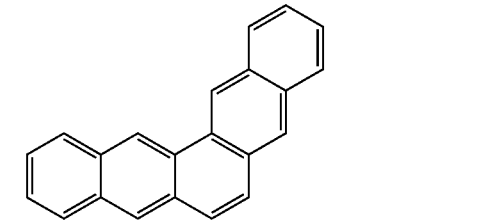

2-11

-continued
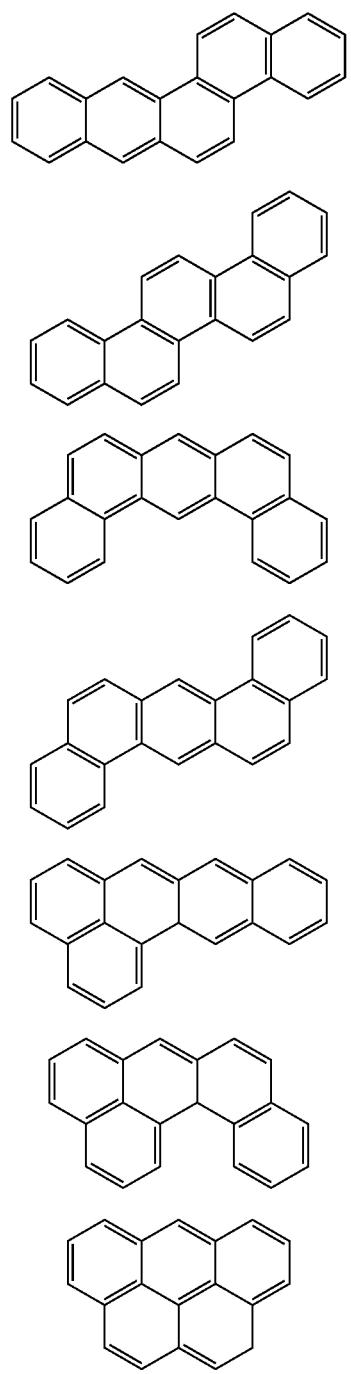
2-12
2-13
2-14
2-15
2-16
2-17
2-18
-continued
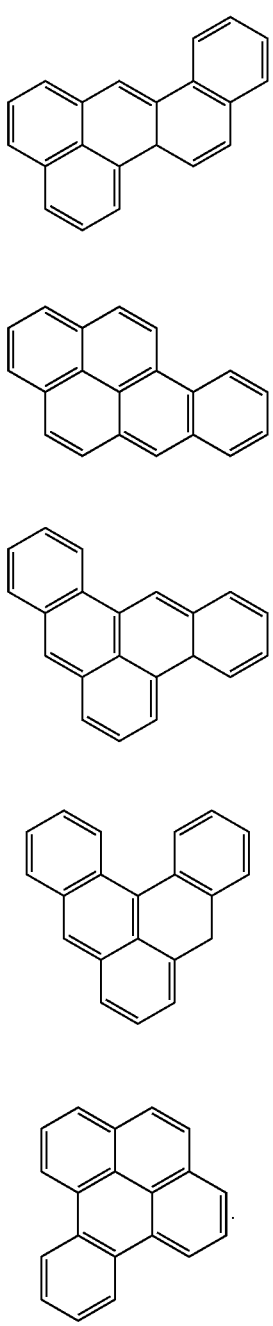
2-19
2-20
2-21
2-22
2-23
* * * * *